(12) United States Patent
Hori et al.

(10) Patent No.: US 10,518,369 B2
(45) Date of Patent: Dec. 31, 2019

(54) METHOD FOR MANUFACTURING HEAT EXCHANGER PLATE AND METHOD FOR FRICTION STIR WELDING

(71) Applicant: NIPPON LIGHT METAL COMPANY, LTD., Tokyo (JP)

(72) Inventors: Hisashi Hori, Shizuoka (JP); Nobushiro Seo, Shizuoka (JP)

(73) Assignee: NIPPON LIGHT METAL COMPANY, LTD., Tokyo (JP)

(*) Notice: Subject to any disclaimer, the term of this patent is extended or adjusted under 35 U.S.C. 154(b) by 22 days.

(21) Appl. No.: 15/784,731

(22) Filed: Oct. 16, 2017

(65) Prior Publication Data

US 2018/0043483 A1    Feb. 15, 2018

Related U.S. Application Data

(62) Division of application No. 14/433,183, filed as application No. PCT/JP2013/077378 on Oct. 8, 2013, now Pat. No. 9,821,419.

(30) Foreign Application Priority Data

Oct. 10, 2012 (JP) .................... 2012-224718
Feb. 4, 2013 (JP) .................... 2013-019354

(51) Int. Cl.
   *B23K 20/12*   (2006.01)
   *B23P 15/26*   (2006.01)
   (Continued)

(52) U.S. Cl.
   CPC ............ *B23P 15/26* (2013.01); *B23K 20/002* (2013.01); *B23K 20/122* (2013.01);
   (Continued)

(58) Field of Classification Search
   CPC .... B23K 20/122–1295; B23K 2101/14; B23K 20/24; B23K 20/002; B23K 2103/10; B23P 15/26; Y10T 29/4935
   (Continued)

(56) References Cited

U.S. PATENT DOCUMENTS 5,611,479 A * 3/1997 Rosen ................. B23K 20/122
                                                          228/112.1
5,893,507 A   4/1999 Ding et al.
(Continued)

FOREIGN PATENT DOCUMENTS

CN    101657289 A    2/2010
CN    101772395 A    7/2010
(Continued)

OTHER PUBLICATIONS

Japanese Office Action issued in corresponding Japanese Patent Application No. 2013-19354 dated Jul. 11, 2017.
(Continued)

*Primary Examiner* — Kiley S Stoner
(74) *Attorney, Agent, or Firm* — Squire Patton Boggs (US) LLP

(57) ABSTRACT

Certain embodiments relate to a heat exchanger plate capable of performing friction stir welding at a deep position of the heat exchanger plate, and improving air-tightness and water-tightness. A method may include a lid groove closing process to insert a lid plate into a lid groove formed at a periphery of a concave groove opening to a surface of a base member. The method may also include a primary joining process to perform friction stirring while relatively moving a primary joining rotary tool equipped with a stirring pin along a butting portion of a side wall of the lid groove and a side surface of the lid plate. In the primary joining process, the rotating stirring pin may be inserted into the butting
(Continued)

portion, and the friction stirring may be performed in a state of only the stirring pin being in contact with the base member and the lid plate.

4 Claims, 11 Drawing Sheets

(51) Int. Cl.
- *B23K 20/00* (2006.01)
- *B23K 20/24* (2006.01)
- *B23K 101/14* (2006.01)
- *B23K 103/10* (2006.01)

(52) U.S. Cl.
CPC ........ *B23K 20/129* (2013.01); *B23K 20/1265* (2013.01); *B23K 20/24* (2013.01); *B23K 2101/14* (2018.08); *B23K 2103/10* (2018.08); *Y10T 29/4935* (2015.01)

(58) Field of Classification Search
USPC .................................. 228/112.1, 2.1, 183
See application file for complete search history.

(56) References Cited

U.S. PATENT DOCUMENTS

| | | | | |
|---|---|---|---|---|
| 6,193,137 B1* | 2/2001 | Ezumi | ................. | B23K 20/122 228/112.1 |
| 6,328,261 B1* | 12/2001 | Wollaston | ............ | B23K 20/122 228/112.1 |
| 7,552,856 B2* | 6/2009 | Nagano | ............... | B23K 37/0435 228/101 |
| 8,857,696 B1 | 10/2014 | Merah | | |
| 8,966,759 B1* | 3/2015 | Romero | ............... | B23K 20/122 29/890.054 |
| 9,003,649 B1* | 4/2015 | Romero | ............... | B23K 20/122 29/830 |
| 2001/0019073 A1* | 9/2001 | Ezumi | ................. | B23K 20/123 228/112.1 |
| 2002/0000461 A1* | 1/2002 | Jogan | ................... | B23K 20/123 228/112.1 |
| 2002/0153130 A1* | 10/2002 | Okamoto | ............. | B23K 20/122 165/170 |
| 2002/0158109 A1 | 10/2002 | Gendoh | | |
| 2002/0190100 A1 | 12/2002 | Duncan, Jr. | | |
| 2003/0024965 A1* | 2/2003 | Okamura | ............. | B23K 20/122 228/112.1 |
| 2003/0056368 A1 | 3/2003 | Nyqvist | | |
| 2003/0141343 A1 | 7/2003 | Murakami | | |
| 2004/0035914 A1 | 2/2004 | Hempstead | | |
| 2004/0134971 A1* | 7/2004 | Narita | ................ | B23K 20/122 228/112.1 |
| 2004/0195291 A1 | 10/2004 | Anderson et al. | | |
| 2006/0086775 A1 | 4/2006 | Trapp et al. | | |
| 2007/0152015 A1 | 7/2007 | Burton et al. | | |
| 2007/0181649 A1 | 8/2007 | Park et al. | | |
| 2008/0245516 A1* | 10/2008 | Ishikawa | ............ | B23K 20/1225 165/164 |
| 2008/0245517 A1* | 10/2008 | Ishikawa | ............ | B23K 20/1225 165/169 |
| 2008/0257936 A1 | 10/2008 | Trapp et al. | | |
| 2010/0081005 A1* | 4/2010 | Aoh | ................... | B23K 20/1255 428/615 |
| 2010/0101768 A1 | 4/2010 | Seo et al. | | |
| 2010/0314075 A1* | 12/2010 | Takahashi | ............ | B23K 20/122 165/104.19 |
| 2011/0104515 A1 | 5/2011 | Kou et al. | | |
| 2011/0132968 A1* | 6/2011 | Nakagawa | ........... | B23K 20/122 228/112.1 |
| 2011/0308059 A1 | 12/2011 | Seo | | |
| 2011/0315367 A1* | 12/2011 | Romero | ............... | B23K 20/122 165/185 |
| 2012/0052322 A1 | 3/2012 | Hatakeyama et al. | | |
| 2012/0125522 A1 | 5/2012 | Kato et al. | | |
| 2014/0166731 A1* | 6/2014 | Seo | ................... | B23K 20/122 228/112.1 |
| 2014/0210070 A1 | 7/2014 | Hori | | |
| 2014/0367452 A1* | 12/2014 | Dinda | .................. | B23K 20/122 228/112.1 |
| 2015/0273637 A1* | 10/2015 | Hori | ....................... | B23K 20/24 29/890.03 |
| 2015/0345540 A1* | 12/2015 | Kim | ....................... | F16C 3/023 464/181 |
| 2016/0325374 A1* | 11/2016 | Hori | ..................... | B23K 20/124 |
| 2017/0197274 A1* | 7/2017 | Steel | .................. | B23K 20/1265 |
| 2017/0297142 A1* | 10/2017 | Saito | .................. | B23K 20/1255 |
| 2017/0297143 A1* | 10/2017 | Saito | .................. | B23K 20/1255 |
| 2018/0200829 A1* | 7/2018 | Campbell | ................ | F16B 5/08 |
| 2018/0250767 A1* | 9/2018 | Hori | .................. | B23K 20/1255 |
| 2018/0272479 A1* | 9/2018 | Hori | ........................ | B23P 15/26 |

FOREIGN PATENT DOCUMENTS

| | | |
|---|---|---|
| CN | 102036779 A | 4/2011 |
| CN | 102470479 A | 5/2012 |
| CN | 102470480 A | 5/2012 |
| EP | 1 279 458 A2 | 1/2003 |
| JP | H10249551 A | 9/1998 |
| JP | 2001-321965 A | 11/2001 |
| JP | 2002-257490 A | 9/2002 |
| JP | 2002248584 A * 9/2002 ........... B23K 20/122 |
| JP | 2003136256 A | 5/2003 |
| JP | 2003-225780 A | 8/2003 |
| JP | 2004522591 A | 7/2004 |
| JP | 2004314115 A | 11/2004 |
| JP | 2007-160370 A | 6/2007 |
| JP | 2007-167902 A | 7/2007 |
| JP | 2007-209987 A | 8/2007 |
| JP | 2009-090297 A | 4/2009 |
| JP | 2009-166079 A | 7/2009 |
| JP | 2009-297761 A | 12/2009 |
| JP | 2010-137274 A | 6/2010 |
| JP | 2010-264467 A | 11/2010 |
| JP | 2011020125 A | 2/2011 |
| JP | 2011-041954 A | 3/2011 |
| JP | 2012-020288 A | 2/2012 |
| JP | 2012-50996 A | 3/2012 |
| JP | 2012-50997 A | 3/2012 |
| JP | 2012-161840 A | 8/2012 |
| JP | 2013-039613 A | 2/2013 |
| JP | 2013-049072 A | 3/2013 |
| KR | 20020051857 A | 6/2002 |
| KR | 10-2004-0000456 A | 1/2004 |
| KR | 20100016504 A | 2/2010 |
| KR | 20110082164 A | 7/2011 |
| KR | 10-2012-0046200 A | 5/2012 |
| TW | 200936283 A | 9/2009 |
| WO | 99/54081 A1 | 10/1999 |
| WO | 03001136 A1 | 1/2003 |
| WO | 2008132900 A1 | 11/2008 |
| WO | 2009104426 A1 | 8/2009 |
| WO | 2009142070 A1 | 11/2009 |
| WO | 2009/157519 A1 | 12/2009 |
| WO | 2009157519 A1 | 12/2009 |
| WO | 2010/041529 A1 | 4/2010 |
| WO | 2012070138 A1 | 5/2012 |
| WO | 2013/027532 A1 | 2/2013 |

OTHER PUBLICATIONS

Japanese Office Action dated Jun. 6, 2017, issued in corresponding JP Application No. 2016-109842. (English language machine translation attached).
European Search Report dated Mar. 23, 2017, issued in corresponding EP Application No. 16201512.7.
European Search Report dated Mar. 30, 2017, issued in corresponding EP Application No. 16201515.0.
Korean Office Action and its English Language Translation dated Feb. 21, 2017, issued in corresponding KR Application No. 10-2015-7002543.

(56) References Cited

OTHER PUBLICATIONS

Japanese Office Action dated Mar. 28, 2017, issued in corresponding JP Application No. 2016-109842.
Supplementary European Search Report dated May 20, 2016, corresponding to European Patent Application No. 13845258.6.
Chinese Office Action Application No. 201380040199.4 dated Feb. 14, 2016.
Korean Office Action Application No. 10-2015-7002543 dated Feb. 17, 2016.
Japanese Office Action Application No. 2013-019354 dated Oct. 27, 2015.
Taiwanese Office Action Application No. 102136457 dated Feb. 10, 2015.
Korean Office Action issued in corresponding Application No. 10-2015-7002543, dated Aug. 23, 2016.
International Search Report and Written Opinion dated Dec. 17, 2013, corresponding to International Patent Application No. PCT/JP2013/077378 and English translation thereof.
Japanese Trial Decision Japanese application No. 2013-19354 dated Oct. 31, 2017.

\* cited by examiner

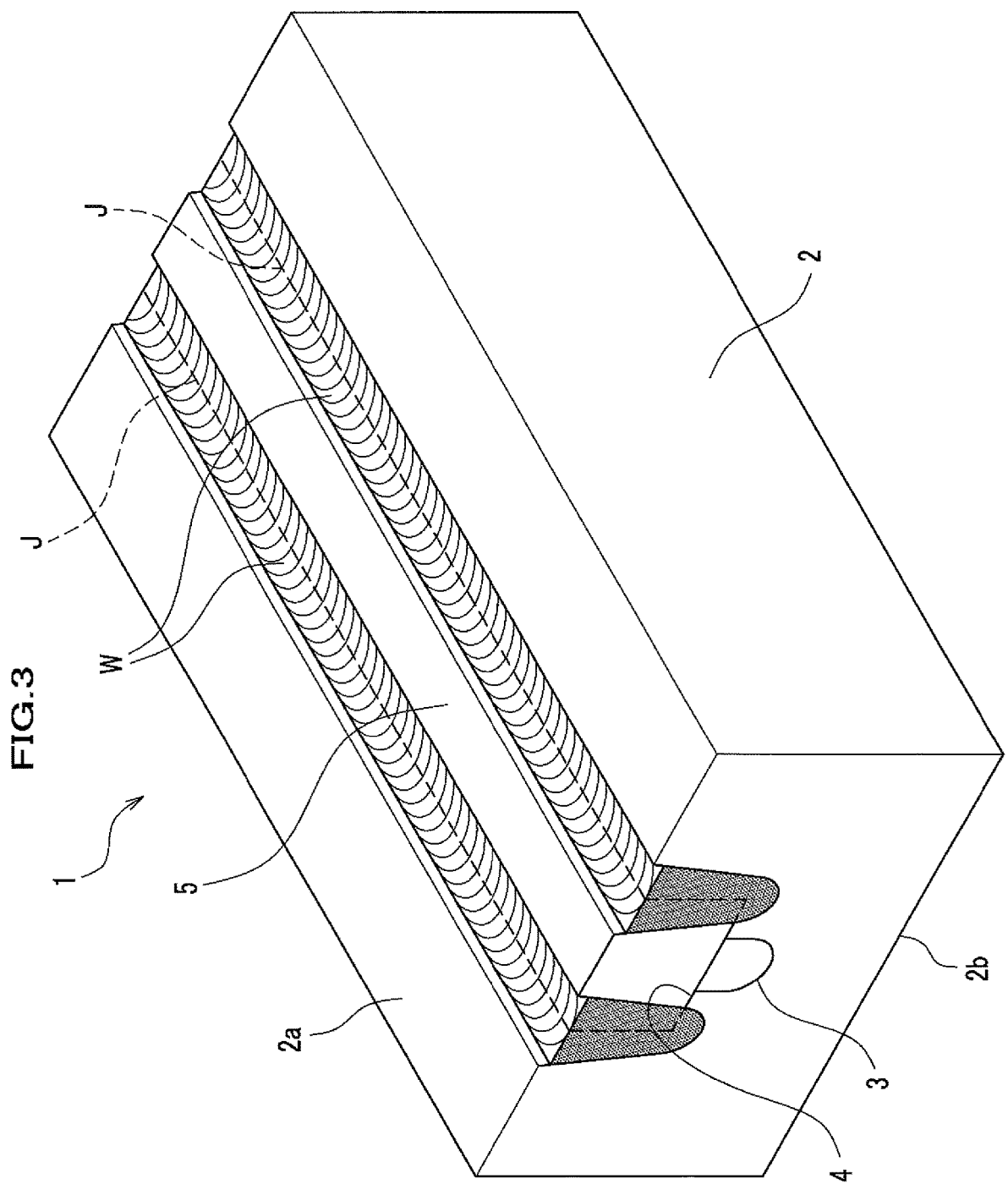

METHOD FOR MANUFACTURING HEAT EXCHANGER PLATE AND METHOD FOR FRICTION STIR WELDING

CROSS REFERENCE TO RELATED APPLICATIONS

This application is a divisional application of U.S. application Ser. No. 14/433,183 filed on Apr. 2, 2015, which is a national stage entry of PCT/JP2013/077378 filed on Oct. 8, 2013, which claims priority of Japanese Application No. 2012-224718 filed on Oct. 10, 2012, and Japanese Application No. 2013-019354 filed on Feb. 4, 2013, the contents of which applications are hereby incorporated by reference herein.

TECHNICAL FIELD

The present invention relates to a method for manufacturing a heat exchanger plate and a method for friction stir welding.

BACKGROUND ART

In a patent document 1, there describes a method for manufacturing a heat exchanger plate to exchange heat or the like while fluid is flowing through a channel formed in a base member. A lid groove opening to a surface of the base member and a concave groove formed on a bottom surface of the lid groove are formed in the base member. When a heat exchanger plate is manufactured, a lid plate is disposed in the lid groove, and a friction stir welding is performed to a butting portion of a side surface of the lid plate and a side wall of the lid groove. When the friction stir welding is performed, a stirring pin of a rotary tool is inserted into a deep position of the butting portion while a bottom surface of a shoulder of the rotary tool is in contact with the base member and the lid plate. Air-tightness and water-tightness of the heat exchanger plate can be improved by performing the friction stirring to the deep position of the butting portion.

PRIOR ART DOCUMENT

Patent Document

Patent document 1: Unexamined Japanese patent publication No. 2002-257490

SUMMARY OF THE INVENTION

Problem to be Solved by the Invention

For example, when the channel of the heat exchanger plate is formed at a deep position in the base member, it is needed to make a depth of the lid groove large and to make a thickness of the lid plate large. In such a case, a length and an outer diameter of the stirring pin of the rotary tool to be used for friction stir welding need to be large. Further, an outer diameter of the shoulder also needs to be larger as the stirring pin is enlarged. However, a friction between the shoulder and the base member and the lid plate becomes larger as the outer diameter of the shoulder becomes larger. Therefore, there is a problem that a load applied on a friction stir device becomes large. For this reason, it has been hard to form a channel at a deep position in the heat exchanger plate.

As another case, for example, there is a case in which a rotary tool is inserted vertically to an overlapped portion formed by overlapping two plate-like metal members, from a surface of the metal members to perform friction stir welding for the metal members. Even in such a case, when a thickness of a metal member is large, so that the overlapped portion is located at a deep position, there is a problem that it is hard to perform friction stir welding.

In such a viewpoint, it is an object of the present invention to provide a method for manufacturing a heat exchanger plate capable of easily performing friction stir welding for a deep position of the heat exchanger plate and improving air-tightness and water-tightness. And it is also an object of the present invention to provide a method for friction stir welding capable of easily performing friction stir welding even when an overlapped portion of overlapped metal members is located at a deep position.

Means for Solving the Problem

In order to solve the problem, a method of the present invention includes a lid groove closing process to insert a lid plate into a lid groove formed at a periphery of a concave groove opening to a surface of a base member; and a primary joining process to perform friction stirring while relatively moving a rotary tool equipped with a stirring pin along a butting portion of a side wall of the lid groove and a side surface of the lid plate, and in the primary joining process, the stirring pin which is rotating is inserted into the butting portion, and the friction stirring is performed in a state of only the stirring pin being in contact with the base member and the lid plate.

Further, a method of the present invention includes a heating medium pipe insertion process to insert a heating medium pipe into a concave groove formed on a bottom surface of a lid groove opening to a surface of a base member; a lid plate insertion process to insert a lid plate into the lid groove; and a primary joining process to perform friction stirring while relatively moving a rotary tool along a butting portion of a side wall of the lid groove and a side surface of the lid plate, and in the primary joining process, the stirring pin which is rotating is inserted into the butting portion, and the friction stirring is performed in a state of only the stirring pin being in contact with the base member and the lid plate.

According to these methods, only the stirring pin of the rotary tool is in contact with the base member and the lid plate, so friction of the rotary tool with the lid plate and the base member to be joined together with each other can be reduced in comparison with the prior manufacturing method. Therefore, a load applied on the friction stir device can be reduced. That is, according to the present invention, friction stir welding can be easily performed at a deep position of the butting portion because a load applied on the friction stir device can be reduced. Thereby, a channel can be easily formed at a deep position in the heat exchanger plate. Further, as friction stirring can be performed at a deep position of the butting portion, air-tightness and water-tightness of the heat exchanger plate can be improved.

Further, it is preferable that a preliminary joining process to preliminarily join the butting portion is further included before the primary joining process. According to this manufacturing method, an aperture of the butting portion can be prevented from being generated when the primary joining process is performed.

Further, a method of the present invention includes a closing process to overlay a lid plate on a front surface of a base member to cover a concave portion or a concave groove opening to the front surface of the base member; and a primary joining process to insert a rotary tool equipped with a stirring pin from a front surface of the lid plate, and to move the rotary tool along an overlapped portion of the front surface of the base member and a back surface of the lid plate, and in the primary joining process, friction stirring is performed to the overlapped portion in a state of only the stirring pin being in contact with both of the base member and the lid plate or with only the lid plate.

Further, a method of the present invention includes a closing process to overlay a lid plate on a front surface of a base member to cover a concave portion or a concave groove opening to the front surface of the base member; and a primary joining process to insert a rotary tool equipped with a stirring pin from a back surface of the base member, and to move the rotary tool along an overlapped portion of the front surface of the base member and a back surface of the lid plate, and in the primary joining process, friction stirring is performed to the overlapped portion in a state of only the stirring pin being in contact with both of the base member and the lid plate or with only the base member.

According to these methods, only the stirring pin of the rotary tool is in contact with the base member or the lid plate, or with both of the base member and the lid plate, so friction between the rotary tool and one of the base member and the lid plate or, friction between the rotary tool and both of them can be reduced in comparison with the prior manufacturing method. Therefore, a load applied on the friction stir device can be reduced. That is, according to the present invention, friction stir welding can be easily performed to the overlapped portion located at a deep position because a load applied on the friction stir device can be reduced. Thereby, a channel can be easily formed also at a deep position in the heat exchanger plate.

Further, it is preferable that a preliminary joining process to preliminarily join the overlapped portion is further included before the primary joining process. According to this manufacturing method, an aperture of the overlapped portion can be prevented from being generated when the primary joining process is performed.

Further, it is preferable that a deburring process to remove burrs, which is generated by friction stirring using the rotary tool, is further included after finishing the primary joining process. According to this manufacturing method, the base member or the lid plate can be finely finished.

Further, a method for friction stir welding of the present invention to join two metal members with use of a rotary tool equipped with a stirring pin, includes an overlapped portion forming process to overlap a front surface of one metal member and a back surface of the other metal member to form an overlapped portion; and a primary joining process to insert the stirring pin, which is rotating, from a front surface of the other metal member, and to perform friction stirring to the overlapped portion in a state of only the stirring pin being in contact with both of the one metal member and the other metal member or with only the other metal member.

According to this method, only the stirring pin of the rotary tool is in contact with both or one of the metal members, so friction between the rotary tool and one of the one metal member and the other metal member, or friction between the rotary tool and both of them can be reduced in comparison with the prior manufacturing method. Therefore, a load applied on the friction stir device can be reduced. That is, according to the present invention, friction stir welding can be easily performed to the overlapped portion located at a deep position because a load applied on the friction stir device can be reduced.

Further, it is preferable that a preliminary joining process to preliminarily join the overlapped portion is further included before the primary joining process. According to this method, an aperture of the overlapped portion can be prevented from being generated when the primary joining process is performed.

Further, it is preferable that a deburring process to remove burrs, which is generated by friction stirring using the rotary tool, is further included after finishing the primary joining process. According to this method, the joined metal members can be finely finished.

Effect of the Invention

By a method for manufacturing a heat exchanger plate according to the present invention, friction stir welding can be easily performed to a butting portion located at a deep position, and air-tightness and water-tightness can be improved. Further, by a method for friction stir welding according to the present invention, friction stir welding can be easily performed even in a case where an overlapped portion of overlapped metal members is located at a deep position.

BRIEF DESCRIPTION OF THE DRAWINGS

FIG. 3 is a perspective view showing a heat exchanger plate according to a first embodiment of the present invention;

MODE FOR CARRYING OUT THE INVENTION

First Embodiment

A first embodiment of the present invention will be described in detail with reference to the attached drawings. First, a primary joining rotary tool and a preliminary joining rotary tool which are used in this embodiment will be described.

Figure 1A:
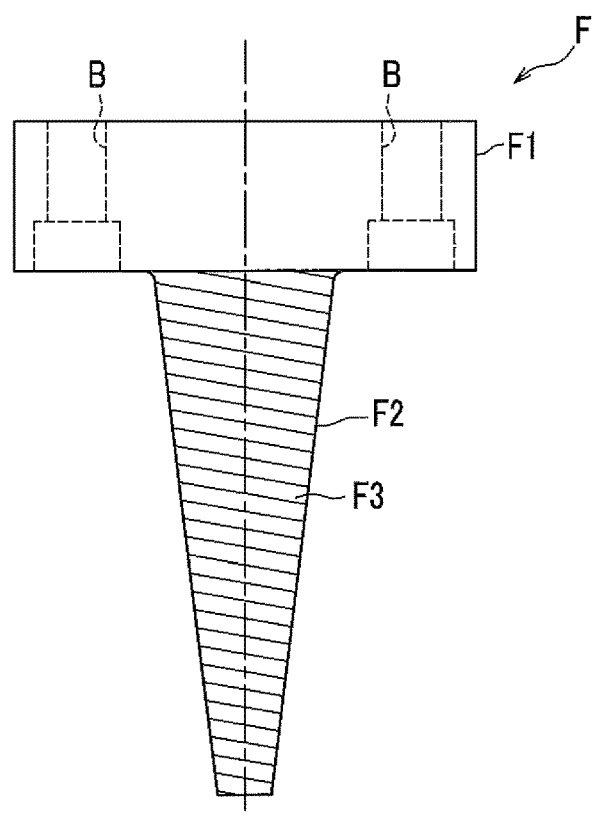
FIG. 1A is a side view showing a primary joining rotary tool to be used in a present embodiment.

As shown in FIG. 1A, the primary joining rotary tool F has a coupling part F1 and a stirring pin F2. The primary joining rotary tool F corresponds to a rotary tool in the scope of claim for patent. The primary joining rotary tool F is made of, for example, tool steel. The coupling part F1 is a part to be coupled to a rotary shaft D of a friction stir device shown in FIG. 1B. The coupling part F1 has a cylindrical shape, and has screw holes B, B for fastening bolts.

The stirring pin F2 hangs down from the coupling part F1, and is coaxial with the coupling part F1. The stirring pin F2 has a tapered shape so as to have a smaller diameter as it goes away from the coupling part F1. The stirring pin F2 has a spiral groove F3 formed on the outer peripheral surface thereof. In this embodiment, the spiral groove F3 is formed so as to rotate in a counter-clockwise direction as it goes downward because the primary joining rotary tool F is rotated in the clockwise direction.

Note that, in a case where the primary joining rotary tool F is rotated in the counter-clockwise direction, it is preferable that the spiral groove F3 is formed so as to rotate in the clockwise direction as it goes downward. By forming the spiral groove F3 in such a manner, plastically fluidized metal is led to a front end side through the spiral groove F3 when friction stirring is performed. Thereby, an amount of metal to be leaked to the outside of metal members (a base member 2 and a lid plate 5 to be described later) to be joined, can be reduced.

Figure 1B:
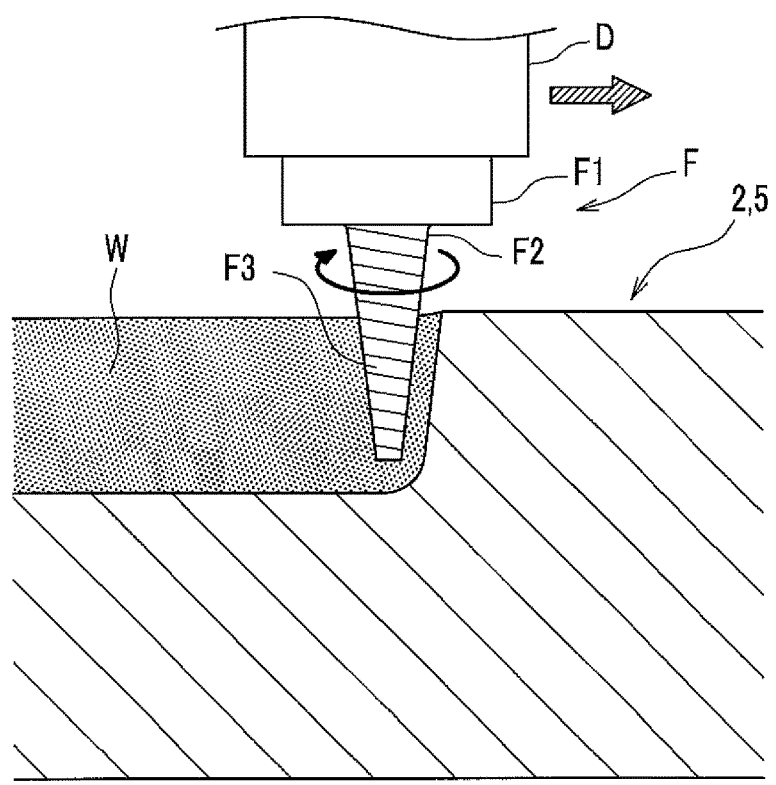
FIG. 1B is a schematic sectional view showing a joining state performed by the primary joining rotary tool.

As shown in FIG. 1B, when friction stir welding is performed by use of the primary joining rotary tool F, only the rotating stirring pin F2 is inserted into the metal members to be joined, and is moved in a state where the coupling part F1 is kept to be apart from the metal members to be joined. In other words, the friction stir welding is performed while a base part of the stirring pin F2 is exposed. A plasticized region W is formed along a moving locus of the primary joining rotary tool F by hardening of metal to which friction stirring is performed.

Figure 2A:
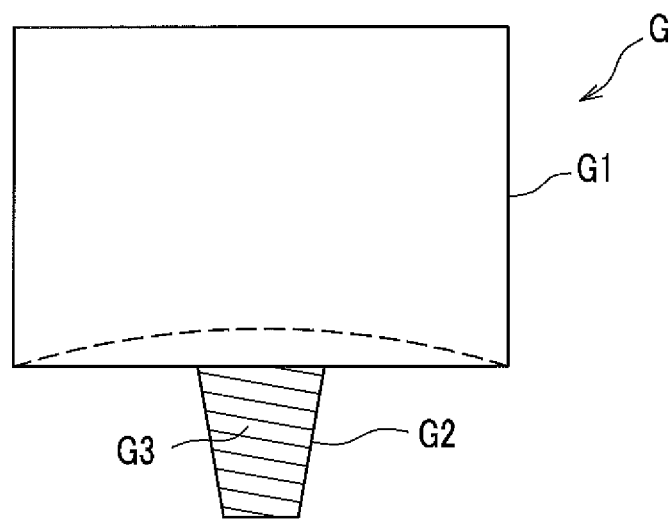
FIG. 2A is a side view showing a preliminary joining rotary tool to be used in the present embodiment.
Figure 2B:
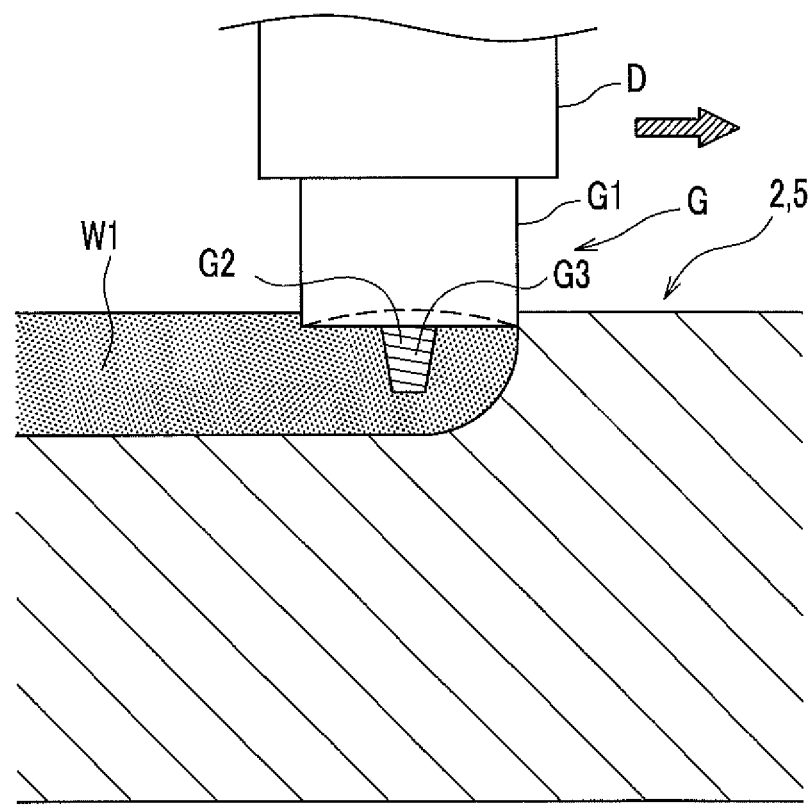
FIG. 2B is a schematic sectional view showing a joining state performed by the preliminary joining rotary tool.

As shown in FIG. 2A, the preliminary joining rotary tool G has a shoulder part G1 and a stirring pin G2. For example, the preliminary joining rotary tool G is made of tool steel. The shoulder part G1 is a part to be coupled to the rotary shaft D of the friction stir device, and also a part to hold plastically fluidized metal, as shown in FIG. 2B. The shoulder part G1 has a cylindrical shape. A lower end face of the shoulder part G1 is formed as a recessed portion in order to prevent the fluidized metal from flowing out to the outside.

The stirring pin G2 hangs down from the shoulder part G1, and is coaxial with the shoulder part G1. The stirring pin G2 has a tapered shape so as to have a smaller diameter as it goes away from the shoulder part G1. The stirring pin G2 has a spiral groove G3 formed on the outer peripheral surface thereof.

When friction stir welding is performed with use of the preliminary joining rotary tool G, the rotating stirring pin G2 and a lower end portion of the shoulder part G1 are inserted into metal members to be joined and is moved as shown in FIG. 2B. A plasticized region W1 is formed along a moving locus of the preliminary joining rotary tool G by hardening of metal for which friction stirring is performed.

Next, a heat exchanger plate of this embodiment will be described. The heat exchanger plate 1 according to this embodiment is constituted mainly by a base member 2 and a lid plate 5 as shown in FIG. 3. The base member 2 has an approximately rectangular parallelepiped shape. A concave groove 3 and a lid groove 4 are formed in the base member 2. Material of the base member 2 is not specially limited as far as friction stirring can be performed. The material is an aluminum alloy in this embodiment.

The concave groove 3 is formed in the middle of the base member 2 so as to pass through from one side surface to the other side surface. The concave groove 3 is formed on a bottom surface of the lid groove 4 so as to be recessed. A bottom part of the concave groove 3 has an arc shape. The concave groove 3 is open on a front surface 2a side of the base member 2.

The lid groove 4 has a larger width than the concave groove 3, and is formed continuously with the concave groove 3 on the front surface 2a side of the concave groove 3. The lid groove 4 has a rectangle shape in a sectional view, and is open on the front surface 2a side thereof.

The lid plate 5 is a plate-like member to be inserted into the lid groove 4. In this embodiment, the lid plate 5 is made of an aluminum alloy equivalent to the material of the base member 2. The lid plate 5 has the same shape as a hollow part of the lid groove 4 in order to be inserted into the lid groove 4 without a gap.

A pair of side walls of the lid groove 4 and a pair of side surfaces of the lid plate 5 are abutted respectively, so that butting portions J, J are formed. Each of the butting portions J, J is joined over a whole length in a depth direction thereof by friction stirring. A space enclosed with the concave groove 3 of the heat exchanger plate 1 and a bottom surface of the lid plate 5 is a channel through which a fluid flows.

Next, a method for manufacturing a heat exchanger plate according to the first embodiment will be described. In the method for manufacturing a heat exchanger plate, a preparing process, a lid groove closing process, a tab member disposing process, a preliminary joining process, and a primary joining process are performed.

Figure 4A:
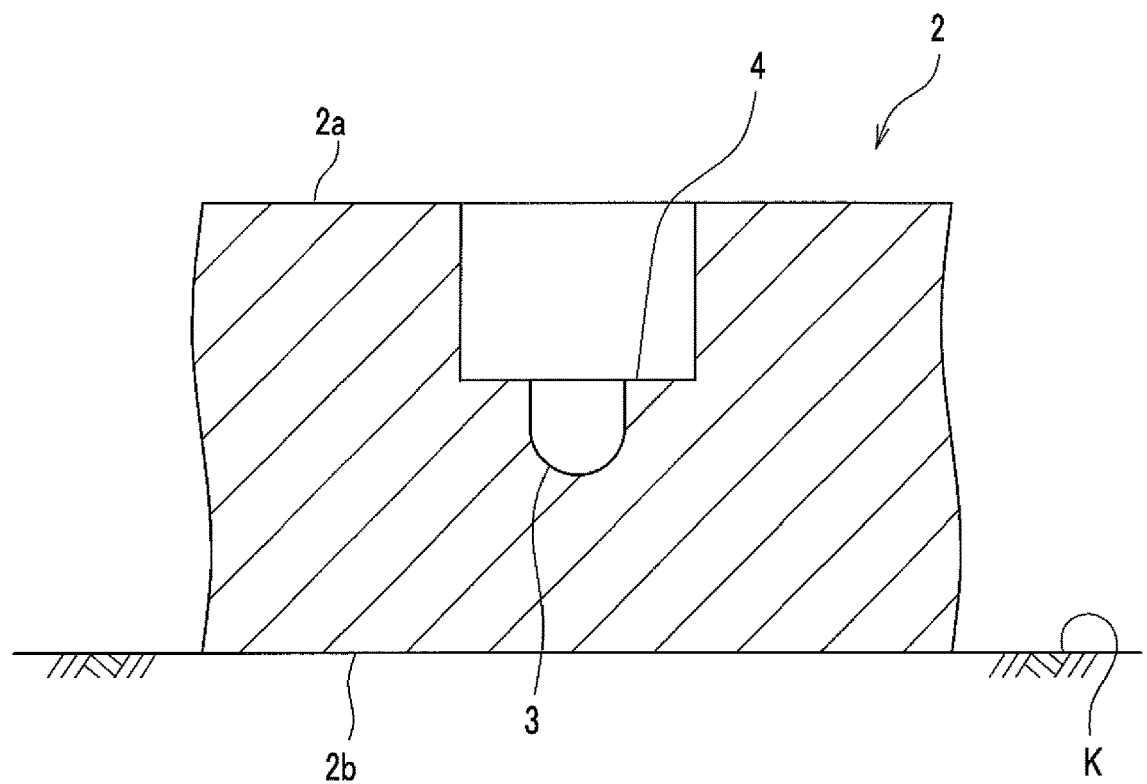
FIG. 4A is a sectional view showing a preparing process of a method for manufacturing the heat exchanger plate according to the first embodiment.

As shown in FIG. 4A, the preparing process is a process to prepare the base member 2. First, the base member 2 is fixed to a pedestal K with a clamp (not shown). And the concave groove 3 and the lid groove 4 are formed by means of cutting with use of an endmill or the like. Note that, the base member 2 having the concave groove 3 and the lid groove 4 formed in advance by die-casting, extrusion molding, or the like, may be used.

Figure 4B:
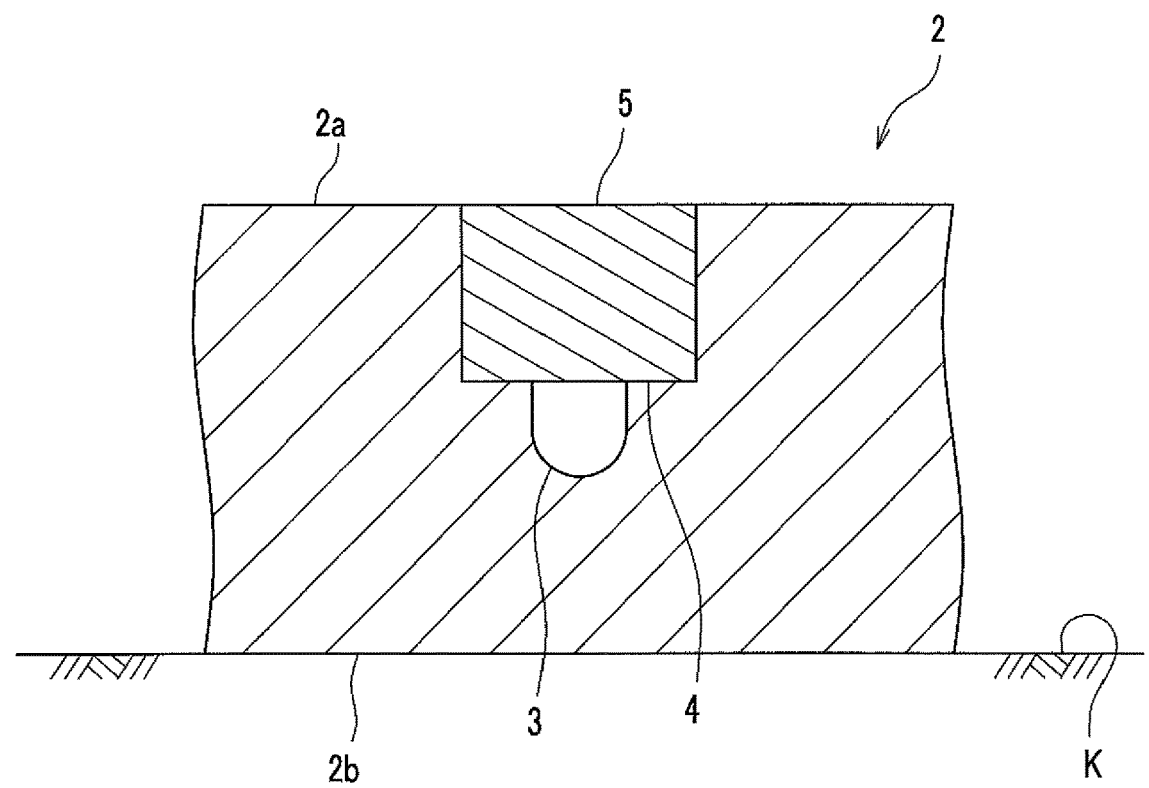
FIG. 4B is a sectional view showing a lid groove closing process of the method for manufacturing the heat exchanger plate according to the first embodiment.

As shown in FIG. 4B, the lid groove closing process is a process where the lid plate 5 is inserted into the lid groove 4. Side walls of the lid groove 4 and side surfaces of the lid plate 5 are abutted respectively, so that the butting portions J, J are formed. A front surface of the lid plate 5 is flush with the front surface 2a.

Figure 5:
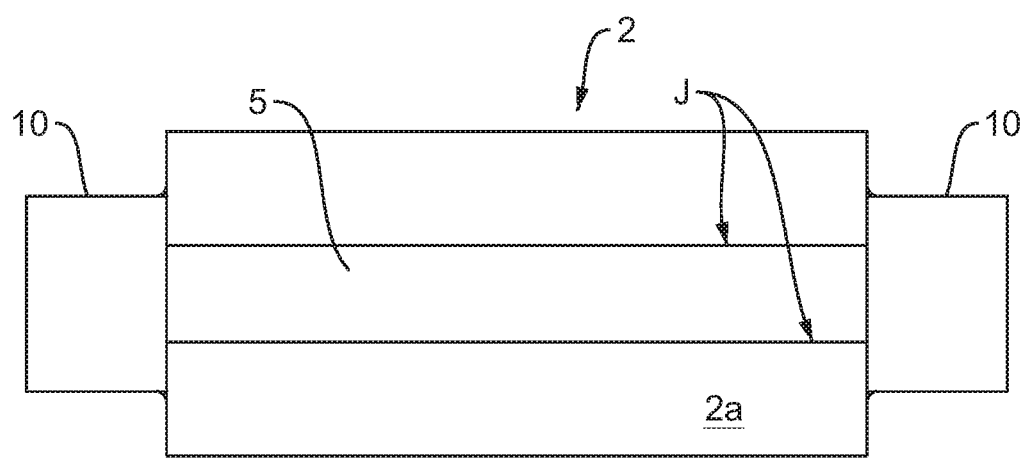
FIG. 5 is a plan view showing a tab member disposing process of the method for manufacturing the heat exchanger plate according to the first embodiment.

As shown in FIG. 5, the tab member disposing process is a process where tab members 10, 10 are disposed at side surfaces of the base member 2. A tab member 10 is a member in which a start position or an end position for friction stirring to be described later is set. A side surface of a tab member 10 abuts on one of the opposing side surfaces of the base member 2, and is disposed on extension lines of the butting portions J, J. In this embodiment, a tab member 10 is made of an aluminum alloy equivalent to the material of the base member 2. A tab member 10 is joined by welding inner corner portions formed with the tab member 10 and the base member 2.

Figure 6A:
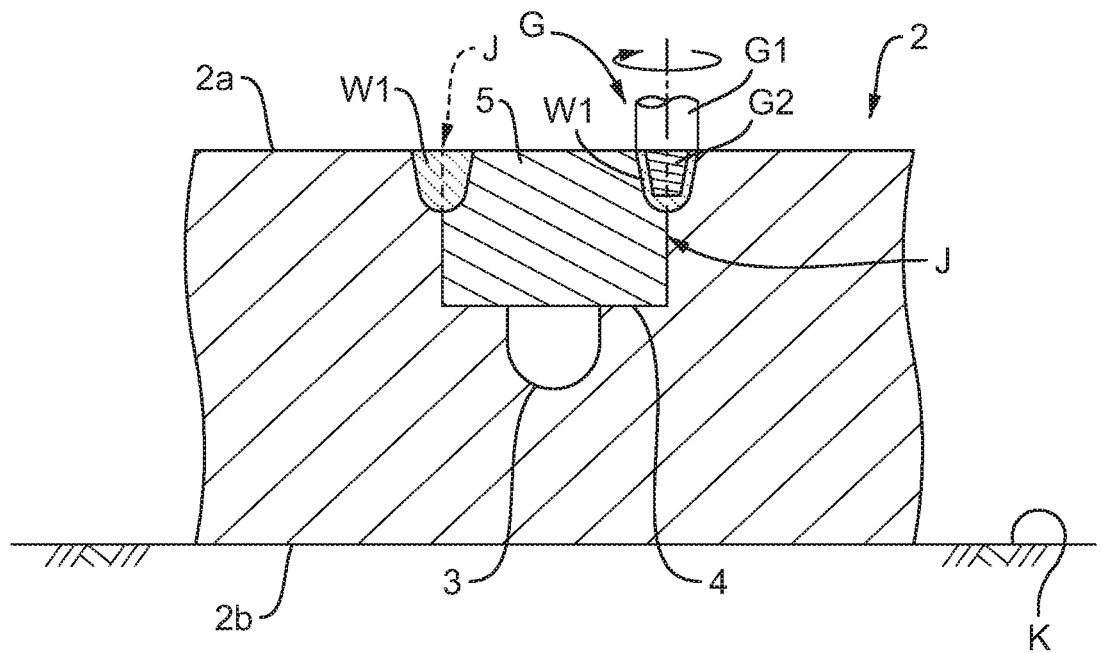
FIG. 6A is a sectional view showing a preliminary joining process of the method for manufacturing the heat exchanger plate according to the first embodiment.

As shown in FIG. 6A, the preliminary joining process is a process where friction stir welding is preliminarily performed to the butting portions J, J with use of the preliminary joining rotary tool G. A start position and an end position of the preliminary joining process are not particularly limited as far as they are located on a surface or surfaces of the base member 2 and the tab members 10. In this embodiment, they are set on a surface of a tab member 10.

Specifically, a start position of the preliminary joining process is set on a surface of one tab member 10, and friction stir welding is performed over the whole length of one butting portion J. The plasticized region W1 is formed along a moving locus of the preliminary joining rotary tool G. And thus, after the preliminary joining rotary tool is moved to the other tab member 10, the preliminary joining rotary tool is made a turn in the surface of the other tab member 10 as it is. Then, friction stir welding is performed over the whole length of the other butting portion J. After the preliminary joining rotary tool G is moved to the one tab member 10, the preliminary joining rotary tool G is removed from the one tab member 10.

Figure 6B:
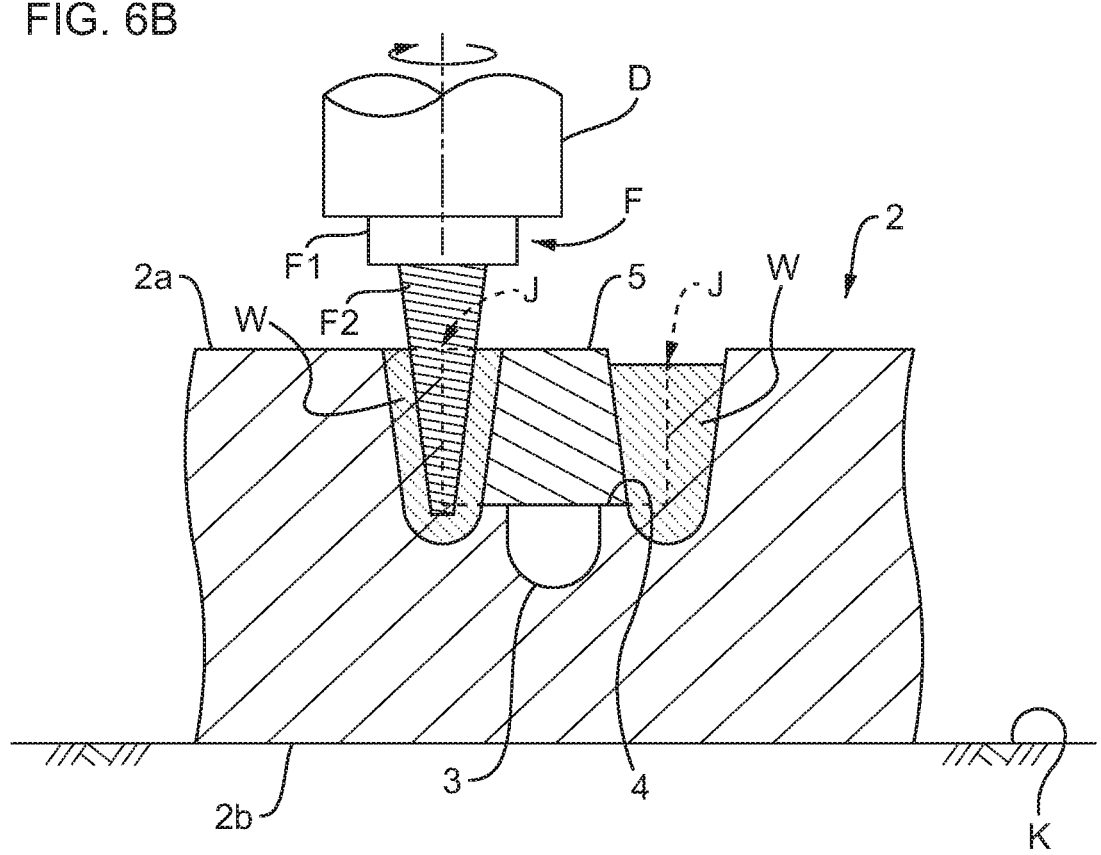
FIG. 6B is the sectional view showing a primary joining process of the method for manufacturing the heat exchanger plate according to the first embodiment.

As shown in FIG. 6B, the primary joining process is a process where friction stir welding is performed for the butting portions J, J with use of the primary joining rotary tool F. It is preferable that a start position and an end position of the primary joining process are set on the surface of a tab member 10. When the primary joining rotary tool F is inserted into the tab member 10, a pull-out hole formed by the preliminary joining rotary tool G may be used. On the other hand, a pilot hole is formed in the tab member 10 in advance, and the primary joining rotary tool F may be inserted through the pilot hole.

In the primary joining process, friction stir welding is performed so as to trace the plasticized region W1 formed in the preliminary joining process. In the primary joining process, it is preferable that the primary joining rotary tool F is inserted until a front end of the primary joining rotary tool F reaches a bottom surface of the lid groove 4. As the stirring pin F2 is made to have a length longer than a depth of the lid groove 4, the coupling part F1 does not abut on the base member 2 nor the lid plate 5 even when the front end of the stirring pin F2 reaches the bottom surface of the lid groove 4. That is, in the primary joining process, a bottom surface of the coupling part F1 does not press upon the front surface of the base member 2 nor the front surface of the lid plate 5.

The plasticized region W is formed along the moving locus of the primary joining rotary tool F. It is preferable that a distance between a butting portion J and the concave groove 3 is set so that plastically fluidized material does not flow in the concave groove 3 while the primary joining process is being performed. After finishing the primary joining process, the tab members 10 are removed from the base member 2 by cutting.

Further, after finishing the primary joining process, a deburring process where burrs generated by friction stirring are removed by cutting may be performed. By performing the deburring process, the surfaces of the base member 2 and the lid plate 5 can be finished to be smooth.

By the method for manufacturing the heat exchanger plate according to this embodiment described above, only the stirring pin F2 of the primary joining rotary tool F abuts on the base member 2 and the lid plate 5. Therefore, a friction of the primary joining rotary tool F with the lid plate 5 and the base plate 2 can be reduced in comparison with a prior method for manufacturing, so that the load to be applied on the friction stir device can be reduced. That is, according to this embodiment, the load applied to the friction stir device can be reduced even when friction stirring is performed for a deep position. Therefore, the channel of the heat exchanger plate 1 can be easily formed at a deep position.

Further, in the primary joining process, it is not always necessary to perform friction stirring over the whole depths of the butting portions J, J. However, by performing friction stirring over the whole depths of the butting portions J like this embodiment, air-tightness and water-tightness of the heat exchanger plate 1 can be improved.

Further, by performing the preliminary joining process, when the primary joining process is performed, apertures between the base member 2 and the lid plate 5 can be prevented from being generated. And in the preliminary joining process and the primary joining process, each of the preliminary joining rotary tool G and the primary joining rotary tool F is moved in a procedure of writing in one stroke in which each of the preliminary joining rotary tool G and the primary joining rotary tool F is not removed from the base member 2 halfway in the friction stirring. Therefore, time and labor of the work can be reduced.

Note that, in the preliminary joining process, friction stirring may be performed discontinuously so that the plasticized region W1 by the preliminary joining rotary tool G is formed intermittently. Further, in the preliminary joining process, the butting portions J, J may be joined by welding. And further, a tab member 10 and the base member 2 may be preliminarily joined by the preliminary joining rotary tool G.

Second Embodiment

Next, a second embodiment of the present invention will be described. A heat exchanger plate according to the second embodiment is different from the first embodiment in the point that this heat exchanger plate is provided with a heating medium pipe 6. The heating medium pipe 6 is a member through which a fluid flows.

In a method for manufacturing the heat exchanger plate according to the second embodiment, a preparing process, a heating medium pipe insertion process, a lid groove closing process, a preliminary joining process, and a primary joining process are performed.

Figure 7A:
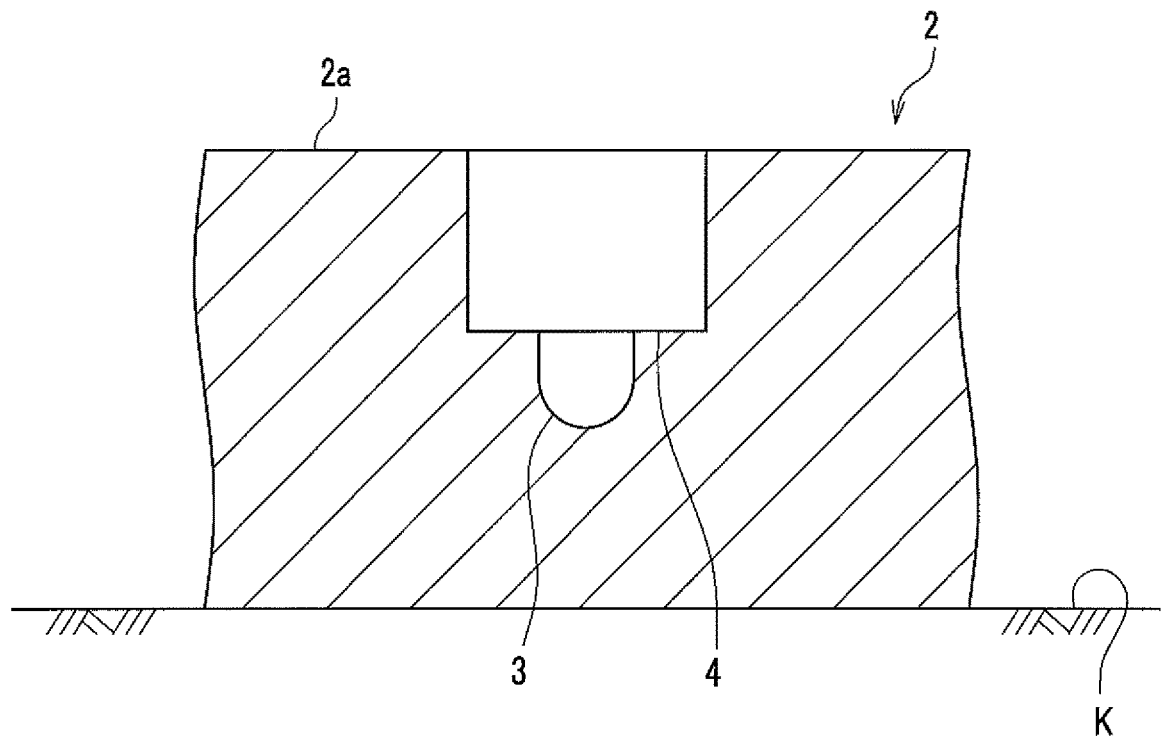
FIG. 7A is a sectional view showing a preparing process of a method for manufacturing a heat exchanger plate according to a second embodiment of the present invention.

As shown in FIG. 7A, the preparing process is a process to prepare the base member 2.

Figure 7B:
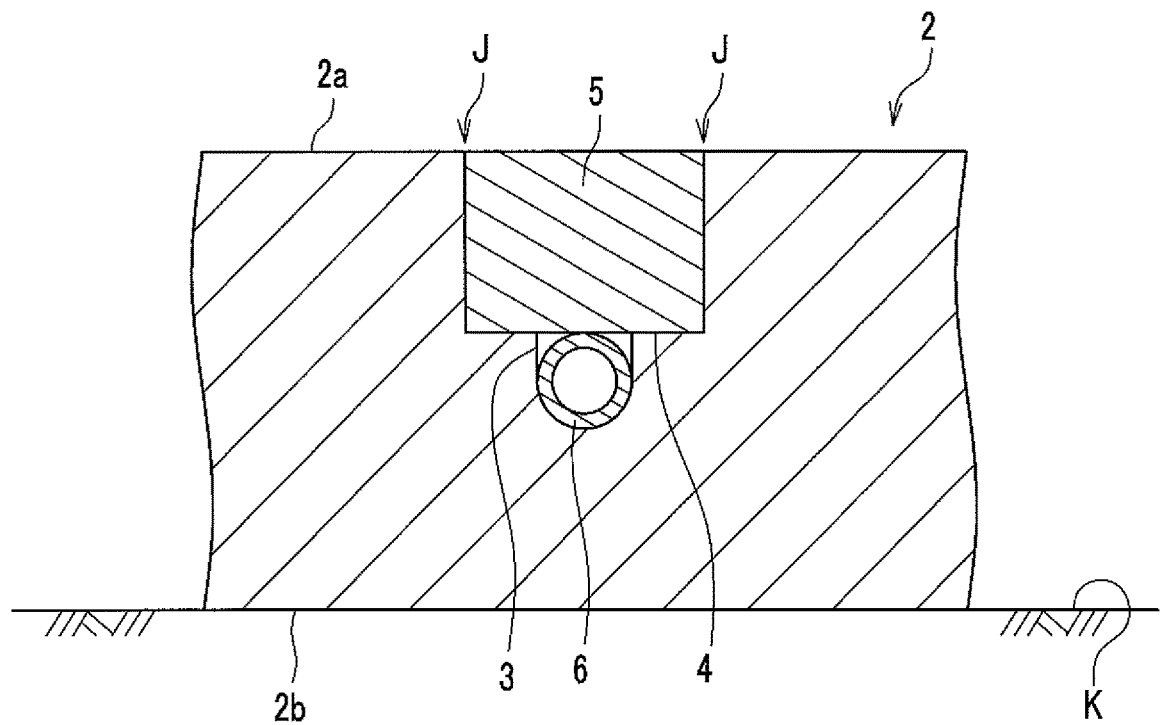
FIG. 7B is a sectional view showing a lid groove closing process of the method for manufacturing the heat exchanger plate according to the second embodiment of the present invention.

As shown in FIG. 7B, the heating medium pipe insertion process is a process to insert the heating medium pipe 6 into the concave groove 3. Sizes and the like of the concave groove 3 and the heating medium pipe 6 can be appropriately set. In this embodiment, an outer diameter of the heating medium pipe 6 is substantially the same as a width and a depth of the concave groove 3.

The lid groove closing process is a process to insert the lid plate 5 into the lid groove 4. Each butting portion J is formed by butting of a side wall of the lid groove 4 on a side surface of the lid plate 5. When the lid plate 5 is inserted into the lid groove 4 completely, the lid plate 5 contacts with the heating medium pipe 6, and the front surface 2a of the base member 2 is flush with the front surface of the lid plate 5.

The preliminary joining process is a process to perform joining preliminarily for the butting portions J. The preliminary joining process is performed in the same manner as the first embodiment.

Figure 8A:
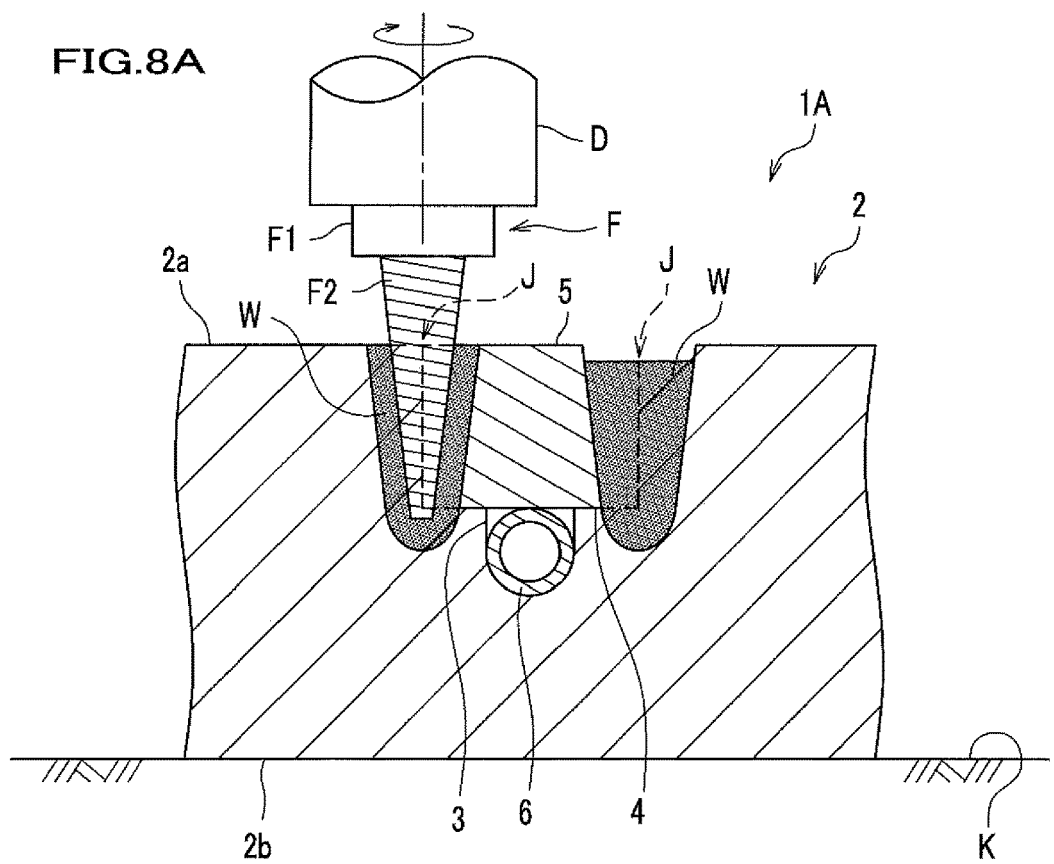
FIG. 8A is a sectional view showing a primary joining process according to the second embodiment.

As shown in FIG. 8, the primary joining process is a process to perform friction stir welding for the butting portions J, J with use of the primary joining rotary tool F. The primary joining process is performed in the same manner as the first embodiment. The plasticized regions W, W are formed along the moving locus of the primary joining rotary tool F. Each plasticized region W is formed over the whole depth of one of the butting portions J, J.

The method for manufacturing the heat exchanger plate according to the second embodiment can exhibit the effect substantially equivalent to the first embodiment. Further, the heat exchanger plate 1A equipped with the heating medium pipe 6 can be easily manufactured.

For example, the shapes of the concave groove 3, the lid groove 4, the lid plate 5, and the heating medium pipe 6 according to the first embodiment and the second embodiment are just examples, and these may be other shapes. Further, when a level difference is generated between the front surface 2a of the base member 2 and a surface of the plasticized region W after the primary joining process, a build-up welding may be performed to eliminate the level difference. Or, a metal member is placed on the surface of the plasticized region W, and friction stir welding may be performed for this metal member and the base member 2 with a rotary tool.

In this embodiment, the case having the lid groove 4 is exemplified. However, the lid plate 5 may be directly inserted into the concave groove 3 without the lid groove 4.

Figure 8B:
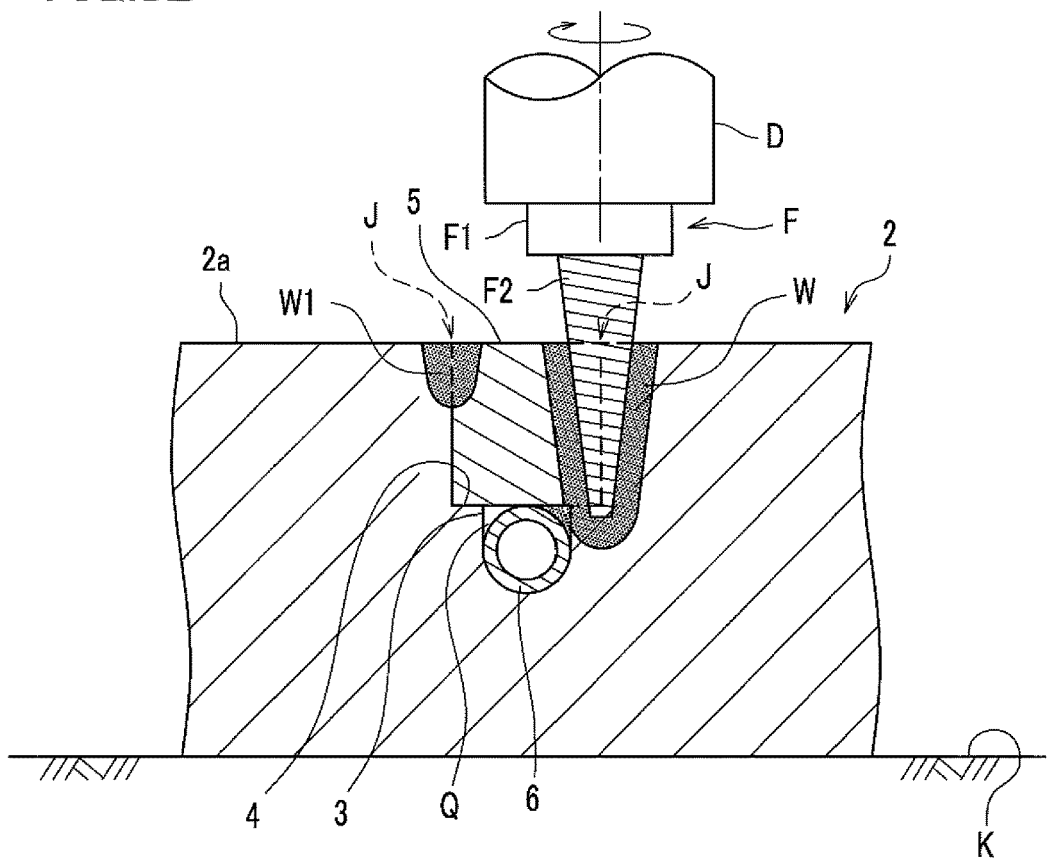
FIG. 8B is an enlarged sectional view showing a modified example of the primary joining process according to the second embodiment.

As shown in FIG. 8B, in a case where a gap part Q is formed around the heating medium pipe 6, the gap part Q may be embedded by the primary joining process. When the lid plate 5 is inserted into the lid groove 4 in the lid groove closing process, the gap part Q is formed by the concave groove 3, the bottom surface of the lid plate 5, and the heating medium pipe 6. In the primary joining process, plastically fluidized material made by the primary joining rotary tool F is flowed in the gap part Q. Thereby, the gap part Q around the heating medium pipe 6 is filled with metal, so that air-tightness and water-tightness can be further improved.

Third Embodiment

Next, a third embodiment of the present invention will be described. In a method for manufacturing the heat exchanger plate according to the third embodiment, the lid groove 4 is not formed in the base member 2, and a lid plate 5 is placed on the front surface 2a of the base member 2. The method for manufacturing the heat exchanger plate according to the third embodiment differs from the first embodiment in this point.

In the method for manufacturing the heat exchanger plate according to the third embodiment, a preparing process, a concave groove closing process, a preliminary joining process, and a primary joining process are performed.

Figure 9A:
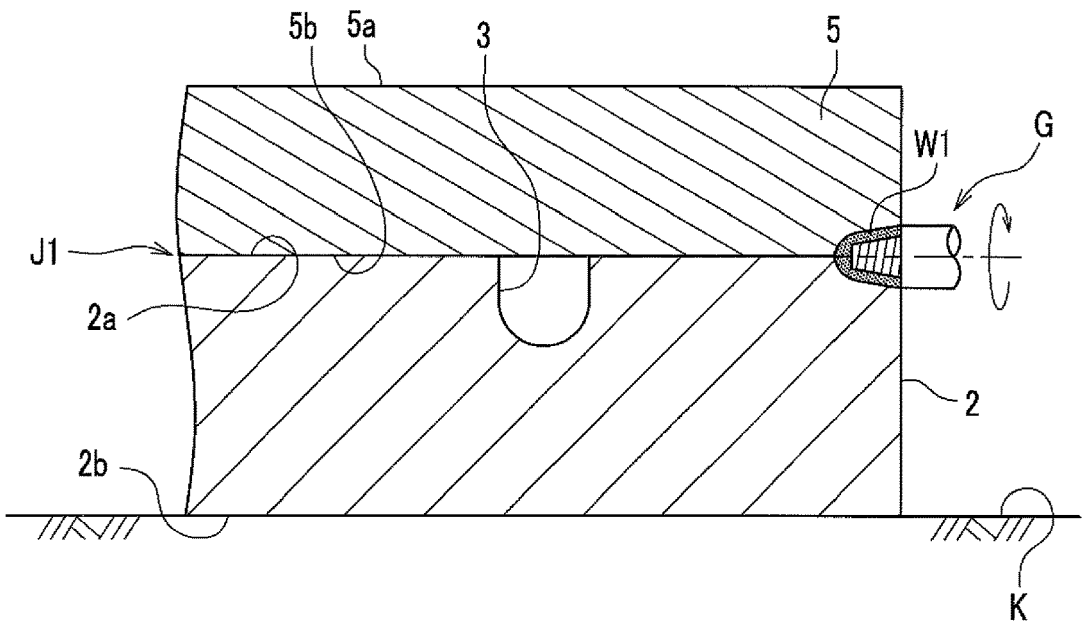
FIG. 9A is a sectional view showing a preliminary joining process of a method for manufacturing a heat exchanger plate according to a third embodiment of the present invention.

As shown in FIG. 9A, the preparing process is a process to prepare a base member 2. A concave groove 3 is formed on the front surface 2a of the base member 2.

The concave groove closing process (closing process) is a process to place a lid plate 5 on the front surface 2a of the base member 2 to cover the top of the concave groove 3. In the concave groove closing process, an overlapped portion J1 is formed by overlapping the front surface 2a of the base member 2 and a back surface 5b of the lid plate 5.

The preliminary joining process is a process to perform joining preliminarily for the overlapped portion J1. In the preliminary joining process of this embodiment, the preliminary joining rotary tool G is inserted from side surfaces of the base member 2 and the lid plate 5 to perform friction stir welding for the overlapped portion J1. After the preliminary joining process, there remains a plasticized region W1 formed on the side surfaces of the base member 2 and the lid plate 5.

Figure 9B:
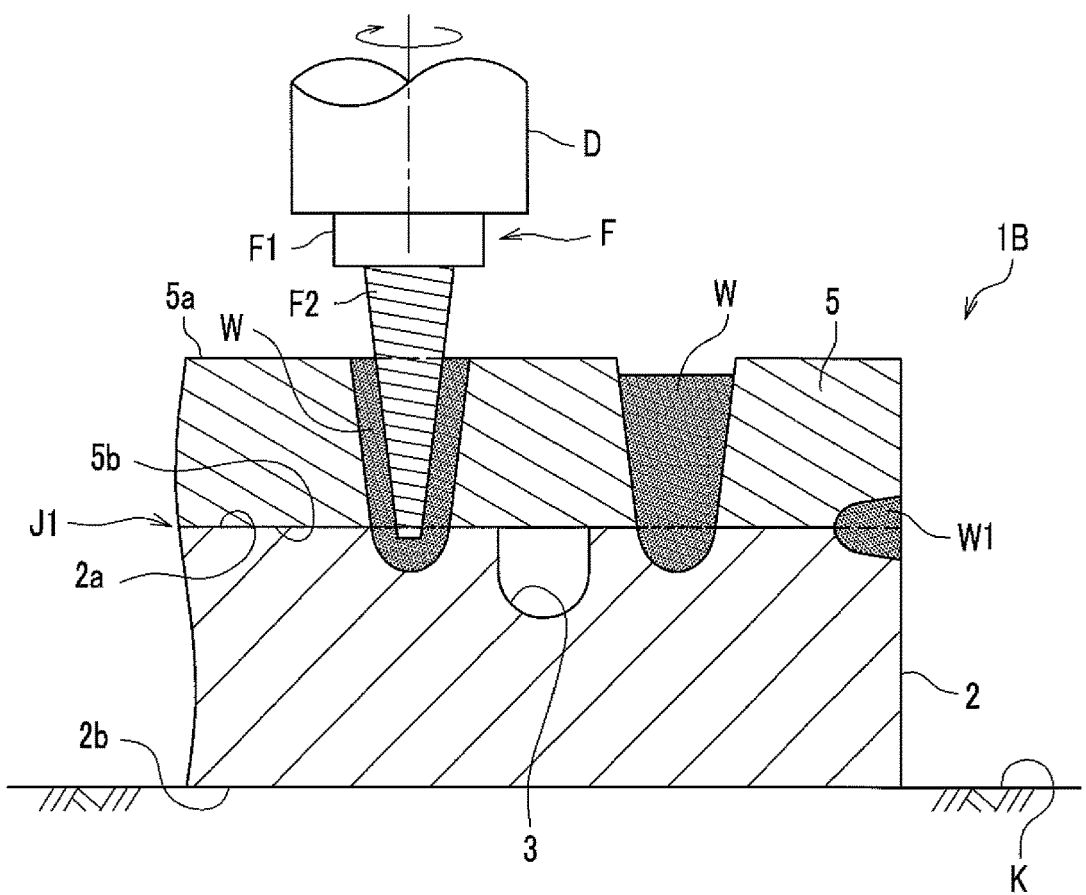
FIG. 9B is a sectional view showing a primary joining process of the method for manufacturing the heat exchanger plate according to the third embodiment of the present invention.

As shown in FIG. 9B, the primary joining process is a process to perform friction stir welding to the overlapped portion J1 with use of the primary joining rotary tool F. In this embodiment, the front end of the stirring pin F2 of the primary joining rotary tool F is inserted from a front surface 5a of the lid plate 5 vertically into the base member 2. And, in the primary joining process, friction stirring is performed without contacting the coupling part F1 with the lid plate 5. Thus, the heat exchanger plate 1A is manufactured.

Even in a case where a method for manufacturing a heat exchanger plate has a process configuration of placing the lid plate 5 having a large thickness on the surface 2a of the base member 2 without forming the lid groove 4 like the method for manufacturing the heat exchanger plate according to the third embodiment, a heat exchanger plate 1B can be easily manufactured. That is, in the third embodiment, the thickness of the lid plate 5 is large, so that the overlapped portion J1 is located at a deep position. However, as only the stirring pin F2 is configured to contact with the base member 2 and the lid plate 5, a friction between the primary joining rotary tool F and a group of the base member 2 and the lid plate 5 can be reduced in comparison with the prior method for manufacturing, so that the load applied on the friction stir device can be reduced. Namely, according to this embodiment, the load applied on the friction stir device can be reduced even in a case where friction stirring is performed at a deep position. Therefore, a channel of the heat exchanger plate 1A can be easily formed at a deep position.

Further, by performing the preliminary joining process, when the primary joining process is performed, an aperture between the base member 2 and the lid plate 5 can be prevented from being generated.

Further, in the preliminary joining process, friction stirring may be discontinuously performed so that the plasticized region W1 by the preliminary joining rotary tool G is formed intermittently. And further, in the preliminary joining process, the overlapped portion J1 may be joined by welding. Further, the preliminary joining process and the primary joining process may be performed with use of a tab member like the first embodiment.

And further, in this embodiment, the stirring pin F2 is set to be inserted to a position where the front end of the stirring pin F2 reaches the base member 2. However, it may be set so that the front end of the stirring pin F2 does not reach the base member 2. That is, the front end of the stirring pin F2 is inserted to a position where the stirring pin F2 is in contact with only the lid plate 5, and in that state, friction stirring may be performed for the overlapped portion J1. In such a case, the lid plate 5 and the base member 2 are plastically fluidized because of frictional heat generated by rubbing the lid plate 5 with the stirring pin F2, and thereby the overlapped portion J1 is joined.

Further, in this embodiment, the primary joining rotary tool F is inserted from the front surface 5a of the lid plate 5, but friction stirring may be performed to the overlapped portion J1 by inserting the primary joining rotary tool F from a back surface 2b of the base member 2. Even in such a case, the stirring pin F2 may be set to be inserted to a position where the stirring pin F2 comes into contact with both of the base member 2 and the lid plate 5, or also may be set to be inserted to a position where the stirring pin F2 is in contact with only the base member 2, to perform friction stirring.

Fourth Embodiment

Next, a fourth embodiment of the present invention will be described. A method for manufacturing a heat exchanger plate according to the fourth embodiment differs from the third embodiment in a point that a concave portion 20 provided with a large recess is formed.

In the method for manufacturing a heat exchanger plate according to the fourth embodiment, a preparing process, a closing process, a preliminary joining process, and a primary joining process are performed.

Figure 10A:
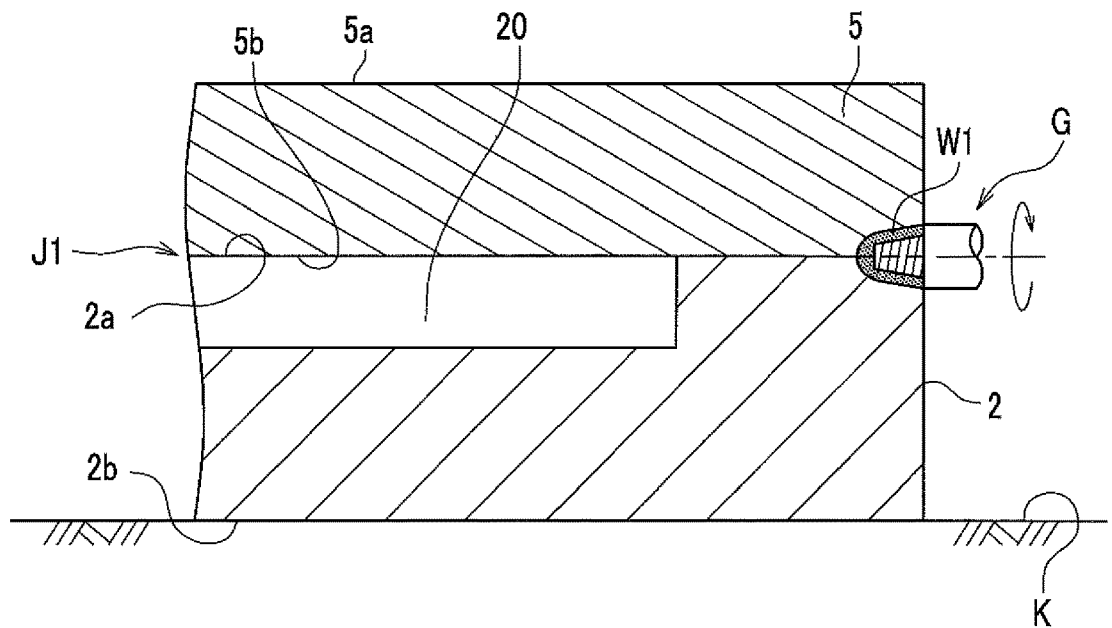
FIG. 10A is a sectional view showing a preliminary joining process of a method for manufacturing a heat exchanger plate according to a forth embodiment of the present invention.

The preparing process is a process to prepare a base member 2, as shown in FIG. 10A. The concave portion 20 is formed on a front surface 2a of the base member 2. The concave portion 20 is a much wider recess than the concave groove 3.

Figure 10B:
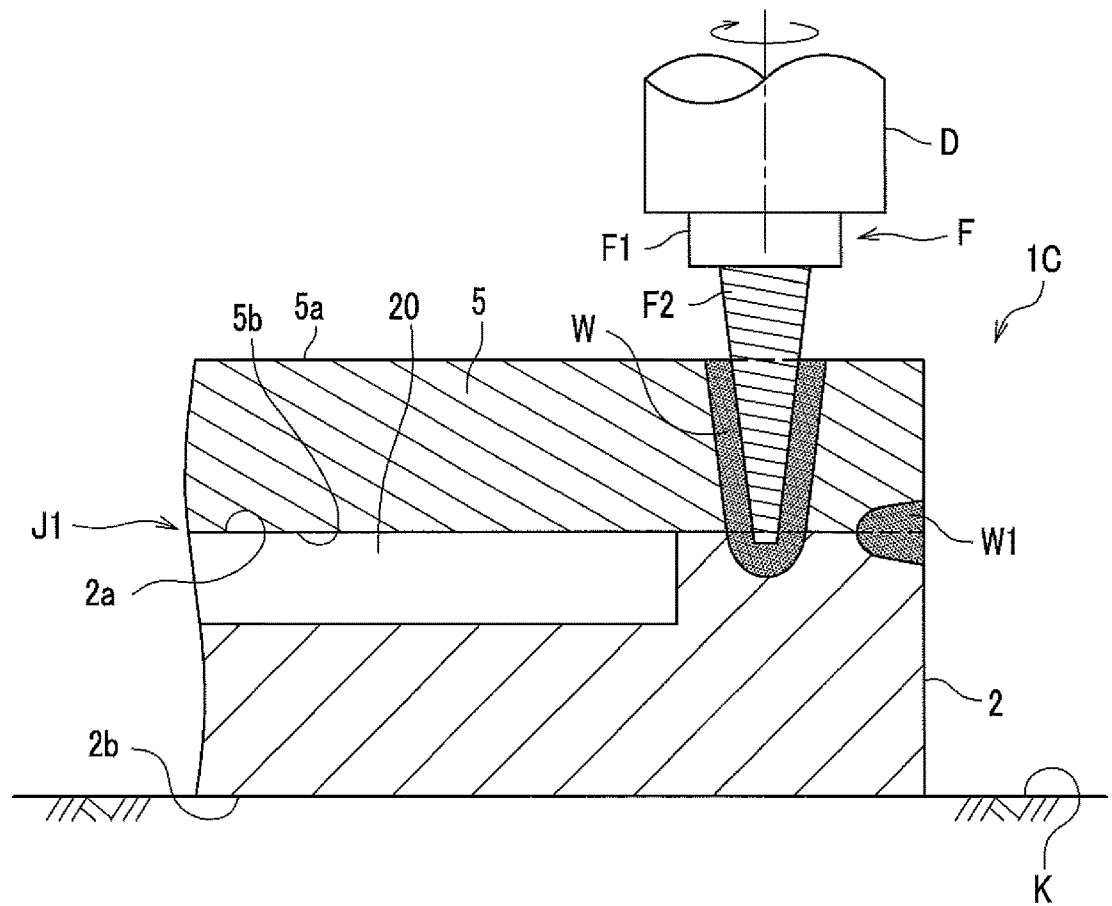
FIG. 10B is a sectional view showing a primary joining process of the method for manufacturing the heat exchanger plate according to the forth embodiment of the present invention.

The concave portion closing process (closing process) is a process to place a lid plate 5 on the front surface 2a of the base member 2 to cover the top of the concave portion 20. In the concave portion closing process, an overlapped portion J1 is formed by overlaying a back surface 5b of the lid plate 5 on the front surface 2a of the base member 2. As shown in FIG. 10B, the preliminary joining process and the primary joining process are equivalent to the third embodiment, so a detailed description will be omitted. Thus, a heat exchanger plate 1C is manufactured.

The method for manufacturing the heat exchanger plate according to the fourth embodiment can exhibit the effect substantially equivalent to the third embodiment. Further, according to the fourth embodiment, the heat exchanger plate 1C can be easily manufactured even in the case of placing thereon the lid plate 5 having a large thickness and of being provided with the concave portion 20 larger than the concave groove 3.

Further, in this embodiment, the stirring pin F2 is set to be inserted to a position where the front end of the stirring pin F2 reaches the base member 2. However, the stirring pin F2 may be set so that the front end of the stirring pin F2 does not reach the base member 2, that is, the stirring pin F2 may be set to be inserted to a position where the stirring pin F2 is in contact with only the lid plate 5, to perform friction stirring to the overlapped portion J1. In such a case, the lid plate 5 and the base member 2 are plastically fluidized because of frictional heat generated by rubbing the lid plate 5 with the stirring pin F2, thus the overlapped portion J1 is joined.

Further, in this embodiment, the primary joining rotary tool F is inserted from the front surface 5a of the lid plate 5, but friction stirring may be performed for the overlapped portion J1 by inserting the primary joining rotary tool F from a back surface 2b of the base member 2. Even in this case, the stirring pin F2 may be set to be inserted to a position where the stirring pin F2 comes into contact with both of the base member 2 and the lid plate 5, or also may be set to be inserted to a position where the stirring pin F2 is in contact with only the base member 2, to perform friction stirring.

Fifth Embodiment

Next, a method for friction stir welding according to a fifth embodiment of the present invention will be described. The fifth embodiment differs from the other embodiments in a point that two metallic members having no channel like the concave groove 3 or the concave portion 20 are joined.

In the method for friction stir welding according to the fifth embodiment, a preparing process, an overlapping process, a preliminary joining process, and a primary joining process are performed.

Figure 11A:
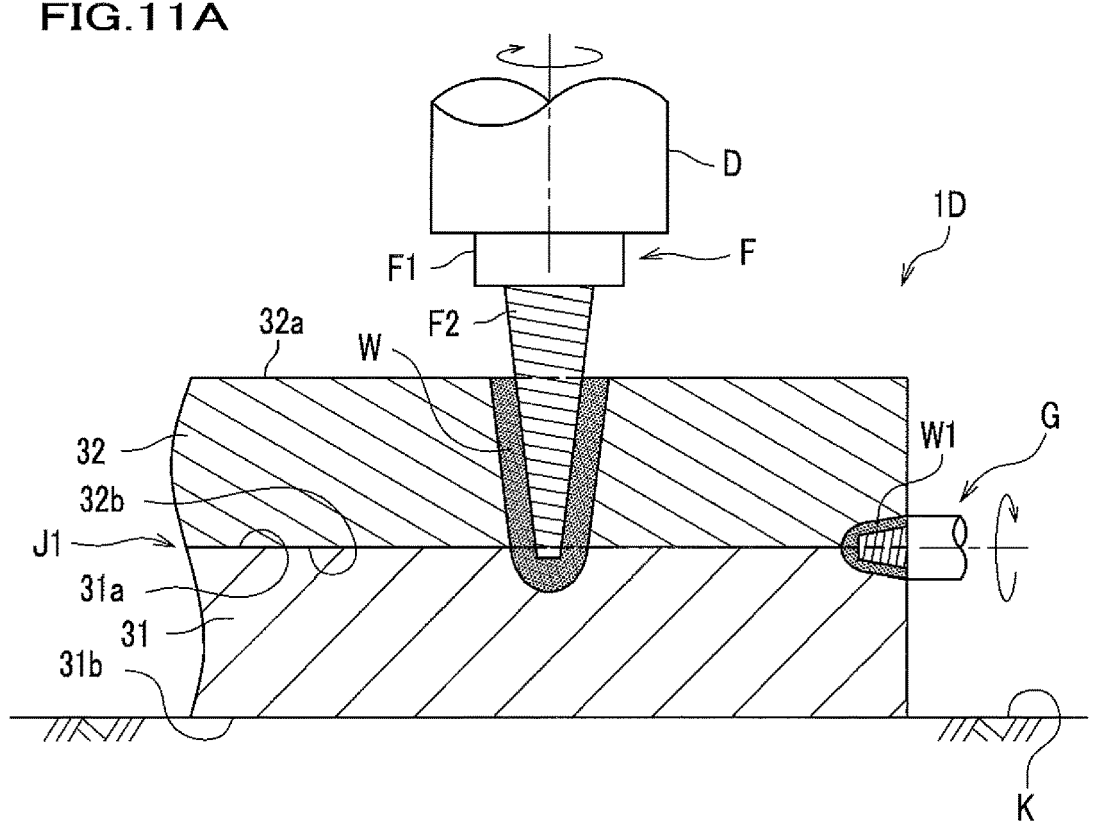
FIG. 11A is a sectional view showing a method for friction stir welding according to a fifth embodiment of the present invention.

As shown in FIG. 11A, the preparing process is a process to prepare metal members 31, 32. The metal members 31, 32 are plate-like metal members. The sort of the metal members 31, 32 may be appropriately selected from metals for which friction stirring can be performed.

The overlapping process is a process to overlap the metal members 31, 32. In the overlaying process, a back surface 32b of the metal member 32 is overlaid on a front surface 31a of the metal member 31 to form an overlapped portion J1.

The preliminary joining process is a process to preliminarily join for the overlapped portion J1. In the preliminary joining process, the preliminary joining rotary tool G is inserted from side surfaces of the metal members 31, 32 in this embodiment, to perform friction stir welding for the overlapped portion J1. After the preliminary joining process, there remains a plasticized region W1 formed on the side surfaces of the metal members 31, 32.

The primary joining process is a process to perform friction stir welding for the overlapped portion J1 with use of the primary joining rotary tool F. In this embodiment, the primary joining rotary tool F is set so that the primary joining rotary tool F is inserted vertically from a front surface 32a of the metal member 32, and the front end of the stirring pin F2 enters the metal member 31. Further, in the primary joining process, friction stirring is performed without contacting of the coupling part F1 with the metal member 32. Thus, a composite plate 1D is manufactured.

By the method for manufacturing a heat exchanger plate according to the fifth embodiment, the composite plate 1D without channel in the inside can be easily manufactured. Even in a special case where the thickness of the metal member 32 is large and the overlapped portion J1 is located at a deep position, friction between the primary joining rotary tool F and the metal members 31, 32 can be reduced in comparison with the prior manufacturing method because only the stirring pin F2 is in contact with the metal members 31, 32. Therefore, the load applied on the friction stir device can be reduced. Thus, even in a case where the overlapped portion J1 is located at a deep position, friction stir welding can be easily performed.

Further, since the preliminary joining process is performed, an aperture between the metal members 31, 32 can be prevented from being generated when the primary joining process is performed.

Further, in the preliminary joining process, friction stirring may be discontinuously performed so that the plasticized region W1 by the preliminary joining rotary tool G is formed intermittently. And further, in the preliminary joining process, the overlapped portion J1 may be joined by welding. Further, the preliminary joining process and the primary joining process may be performed with use of a tab member like the first embodiment.

Figure 11B:
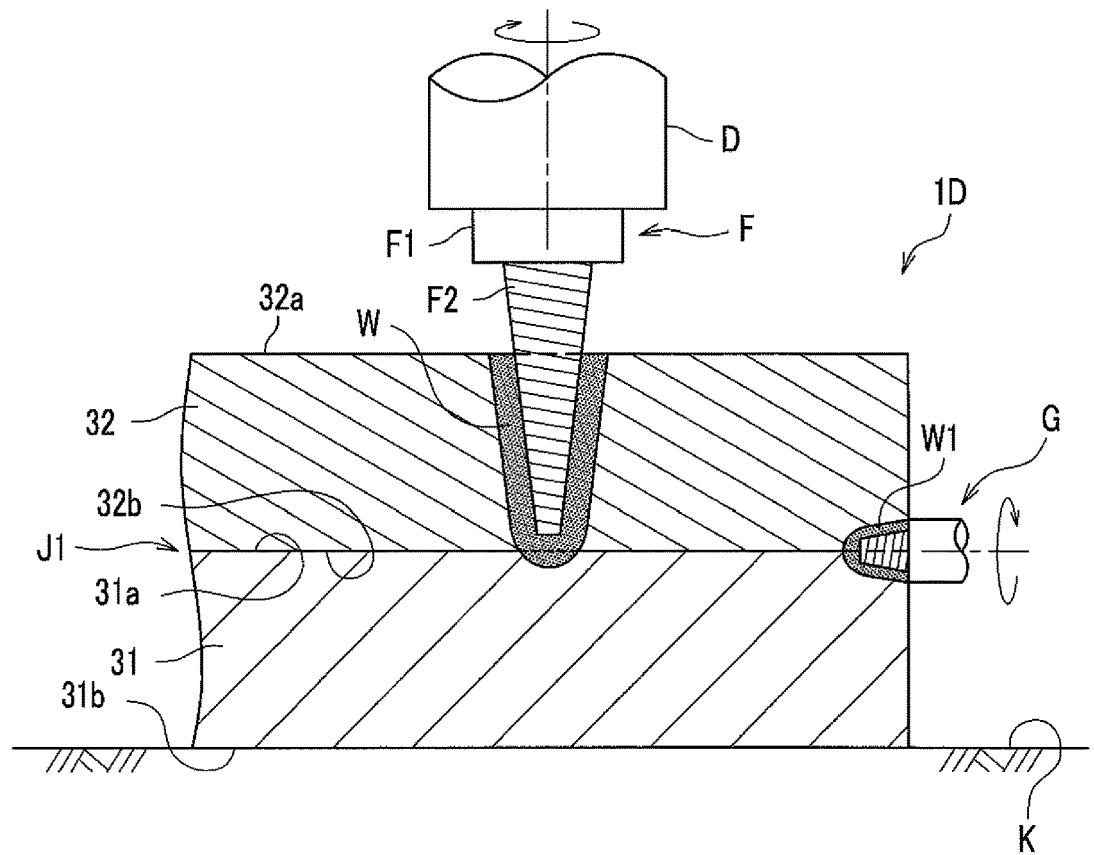
FIG. 11B is a sectional view showing a modified example of the fifth embodiment.

Further, as shown in FIG. 11B, when the primary joining process is performed, friction stirring may be performed in a state where the front end of the stirring pin F2 does not reach the metal member 31, that is, the stirring pin F2 is in contact with only the metal member 32. In such a case, both of the metal members 31, 32 can be joined by contacting of the plasticized region W with the overlapped portion J1. That is, the metal members 31, 32 are plastically fluidized because of frictional heat generated by rubbing the metal member 32 with the stirring pin F2, thus the overlapped portion J1 can be joined.

DESCRIPTION OF THE SYMBOLS

1 Heat exchanger plate
2 Base member
3 Concave groove
4 Lid groove
5 Lid plate
6 Heating medium pipe
10 Tab member
20 Concave portion
31 Metal member
32 Metal member
F Primary joining rotary tool (Rotary tool)
F1 Stirring pin
G Preliminary joining rotary tool
J Butting portion
J1 Overlapped portion
W Plasticized region

We claim:

1. A method for manufacturing a heat exchanger plate, comprising:

a lid groove closing process to insert a lid plate into a lid groove formed at a periphery of a concave groove opening to a surface of a base member;

a primary joining process to perform friction stirring while relatively moving a rotary tool equipped with a stirring pin along a butting portion of a side wall of the lid groove and a side surface of the lid plate; and a deburring process to remove burrs generated by friction stirring using the rotary tool after finishing the primary joining process, wherein the stirring pin has a tapered shape so as to have a smaller diameter in a hanging down direction and has a continuous spiral groove formed on an outer peripheral surface, the spiral groove is configured to rotate in a counter-clockwise direction as it goes downward when the rotary tool is used for rotating in the clockwise direction, and the spiral groove is configured to rotate in the clockwise direction as it goes downward when the rotary tool is used for rotating in the counter-clockwise direction, and wherein, in the primary joining process, the stirring pin which is rotating is inserted into the butting portion until a front end of the stirring pin reaches a bottom surface of the lid groove, and the friction stirring is performed to the butting portion and the bottom surface of the lid groove with a base part of the stirring pin being exposed in a state of only the stirring pin being in contact with the base member and the lid plate while plastically fluidized material does not flow into the concave groove.

2. The method for manufacturing a heat exchanger plate according to claim 1, further comprising:

a heating medium pipe insertion process to insert a heating medium pipe into the concave groove formed on a bottom surface of the lid groove opening to the surface of the base member.

3. The method for manufacturing a heat exchanger plate according to claim 1, further comprising a preliminary joining process to preliminarily join the butting portion before the primary joining process.

4. The method for manufacturing a heat exchanger plate according to claim 2, further comprising a preliminary joining process to preliminarily join the butting portion before the primary joining process.

* * * * *